United States Patent [19]

Leitch et al.

[11] Patent Number: 4,570,389
[45] Date of Patent: Feb. 18, 1986

[54] METHOD OF ADAPTIVE GRINDING

[75] Inventors: Paul A. Leitch, Northfield; Robert C. Chang; Randy E. Thompson, both of Twinsburg, all of Ohio

[73] Assignee: The Warner & Swasey Company, Cleveland, Ohio

[21] Appl. No.: 575,084

[22] Filed: Jan. 30, 1984

[51] Int. Cl.⁴ ............................................ B24B 49/16
[52] U.S. Cl. .................................. 51/325; 51/165.87; 51/165.92
[58] Field of Search ........... 51/165.71, 165.87, 165.88, 51/325, 165.77, 165.92

[56] References Cited

U.S. PATENT DOCUMENTS

| | | | |
|---|---|---|---|
| 3,167,891 | 2/1965 | Coes | 51/165.71 |
| 3,178,861 | 4/1965 | Milias | 51/165.71 |
| 4,464,866 | 8/1984 | Smith | 51/165.87 |

Primary Examiner—Harold D. Whitehead
Attorney, Agent, or Firm—Howard G. Massung; John R. Benefiel; Raymond J. Eifler

[57] ABSTRACT

A grinding adaptive control system and method is described which automatically determines the feed rate to maintain constant wheel sharpness without wheel breakdown. Wheel sharpness at a given feed rate is sensed by the steady state horsepower or normal force, the adaptive control progressively adjusts feed rate in response to changes in wheel sharpness until a steady state feed rate range is reached. Wheel sharpness will then remain essentially constant.

17 Claims, 6 Drawing Figures

METHOD OF ADAPTIVE GRINDING

This invention relates to a parameter adaptive method and control system controlling the grinding process of a grinding machine.

DESCRIPTION OF THE INVENTION

Wheel sharpness is one of the most important variables in the grinding process. A sharp grinding wheel generates lower grinding forces, requires less power to remove a given amount of workpiece material and causes less thermal damage to the workpiece thus permitting higher removal rates. However, a sharp wheel also produces a rougher part surface. In contrast a dull wheel yields a better part surface finish. However, the forces, input power and potential for thermal damage all increase. In precision grinding the object is to produce a part having acceptable surface quality in the shortest time. It is important to establish the correct sharpness and to be able to maintain this desired sharpness during grinding. Accordingly, the invention hereinafter described illustrates an automatic control system which maintains this desired level of sharpness during grinding.

More specifically, the methods described herein monitor two of several process parameters which are used to sense wheel sharpness. In response to small changes in wheel sharpness, one of several process parameters is adjusted to move the process to the point at which the wheel is neither dulling nor sharpening thus maintaining essentially constant wheel sharpness. With controlled wheel sharpness, surface integrity and finish can be maintained constant, grinding time minimized and the need for periodic wheel dressing reduced or eliminated.

Most automatic grinding machine control schemes can be categorized as either controlled feed rate or controlled force. In a controlled feed rate grinding machine the feed rate is maintained at a constant specified value. If the feed rate is low for the type and condition of wheel being used, the wheel will dull with time raising the power and increasing the potential for thermal damage of the workpiece. If the feed rate is high for the type and condition of wheel being used, the wheel will sharpen with time resulting in rougher part surface finish. Also, if the feed rates are low and the wheel is dulling, productivity is less than what could be obtained for the wheel-workpiece combination. Periodic dressing is required to restore the desired level of sharpness to the wheel. The process of wheel dressing is known and will not be discussed. This periodic dressing is unacceptable because it wastes abrasive material and time.

In controlled force grinding machines one component of the grinding force is maintained at a constant specified value. If the force value is low for the type of wheel being used, the wheel will dull with time and the feed rate and removal rate will decrease with time. If the force value is high for the type of wheel being used, the wheel will sharpen with time and, the feed rate will increase, the part surface finish will become rougher. Again, periodic dressing is used to restore the wheel to the desired level of sharpness.

Coes in U.S. Pat. No. 3,167,891 recognized changes in wheel sharpness could be detected by monitoring one of several process parameters, and by adjusting one of the process parameters the wheel could be made to sharpen itself. In this concept when a significant change in sharpness was detected, a process parameter was changed accordingly for a predetermined period of time to cause the wheel to self sharpen. The process was then returned to its normal state of operation. A problem could develop if the predetermined amount of time was too short since the wheel would not have sharpened enough. Consequently, these steps would have to be repeated. If the time was too long the sharpness would be too high and unacceptable surface finish would be produced.

In contrast the present invention relates to:

A system and methods to sense changes in wheel sharpness and to automatically adjust the process so that it converges to an operating point at which wheel sharpness remains essentially constant. The problems associated with wheel dulling or sharpening described above are eliminated. More specifically the methods and system described relate to grinding the surface of workpieces by a grinding machine having a grinding wheel which exhibits regions of attrition and self-sharpening. The system and methods yield a grinding process which employs the following steps: conditioning the surface of the grinding wheel to establish a desired level of wheel sharpness, grinding for a first interval at a determinable level of a first controlled parameter, measuring and storing the value of a first process parameter. correlatable with grinding wheel sharpness generated during the first interval, grinding for a second interval at the determinable level of the first controlled parameter, measuring and storing the value of the first process parameter during the second interval, comparing the stored values of the first process parameter, adjusting the level of the first controlled parameter in accordance with the step of comparing to maintain the sharpness of the grinding wheel at the desired level.

DESCRIPTION OF THE DRAWINGS

Figure 1:
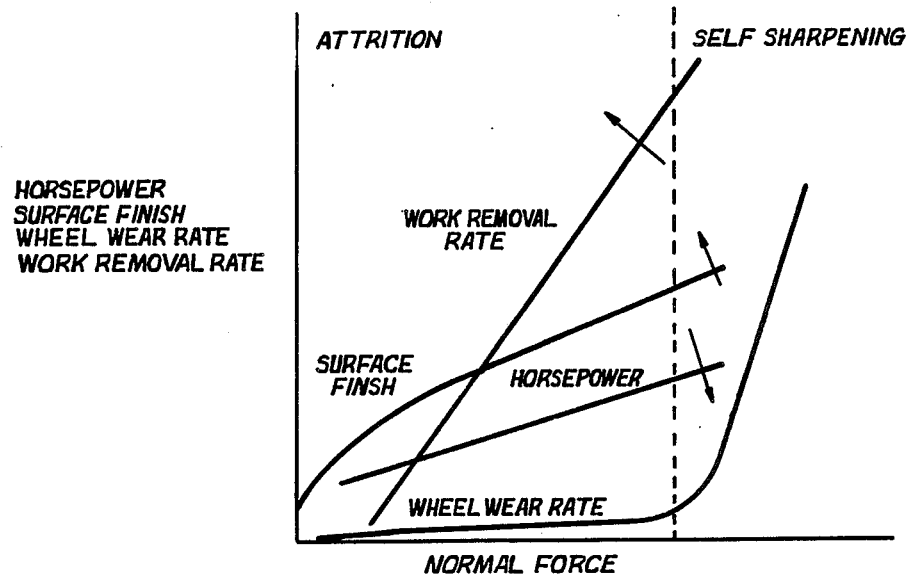
FIG. 1 is a graphic illustration of the grinding process.

In order to appreciate the unique features of this invention the characteristics of the grinding process will be described. It can be shown experimentally that the grinding process behaves as illustrated in FIG. 1. This figure shows how work removal rate, wheel wear rate, horsepower and surface finish change with normal grinding force. The arrows indicate how these relationships change as the wheel sharpens.

FIG. 1 illustrates that the grinding process can be broken into two distinct regions, an attrition region and a self-sharpening region. The attrition region occurs at low force levels. When operating in this region the wheel will dull with time. At high force levels the shelf-sharpening region is defined where the wheel is sharpening with time. In FIG. 1 it can be seen that the transition from one region to the other occurs in the vicinity at which the wheel wear rate increases rapidly.

FIG. 1 shows the characteristics of the grinding process for a given wheel sharpness. It should be emphasized that the wheel is either dulling or sharpening with time depending on the operating conditions.

From the information in FIG. 1 and based on the requirements of precision grinding, that is, to produce parts having acceptable surface finish in the shortest possible time, the following surprising fact was realized. If the wheel is initially dressed to the desired sharpness to produce the required surface finish, the desired sharpness can be maintained essentially constant by operating at the borderline or transition between the attrition and self-sharpening regions. By operating at this transition the work removal rate will be the maximum that can be achieved for the given wheel sharpness without causing the wheel to sharpen and thus produce parts with a rougher surface finish.

In contrast, the prior art such as: Coes (U.S. Pat. No. 3,167,891) has proposed operating in the attrition region and after significant dulling was detected, temporarily drive the process into the self-sharpening region to resharpen the wheel. Thus, the sharpness was allowed to change and, because grinding was done primarily in the attrition region, work removal rate was less than it could have been.

Based upon the relationships shown in FIG. 1, a variety of process methodologies may be devised to operate at a control point on or near the transition between the regions of attrition and self-sharpening. These methods, as described below, generally define a closed loop control system for maintaining grinding wheel sharpness at a constant initial level and require using a desired value of a first operational or process parameter correlatable to wheel sharpness and to thereafter adjust a controlled parameter to insure operation at the desired value of the process parameter such that sharpness remains constant.

The preferred approach is to use either the parameters of normal force (process parameter) and work removal rate (controlled parameter) or horsepower (process parameter) and work removal rate (controlled parameter). Alternate approaches employing other process parameters such as work removal rate, workpiece surface finish and feed rate in combination with appropriate controlled parameters, such as normal force, work removal rate, feed rate and horsepower may be used.

Figure 2:
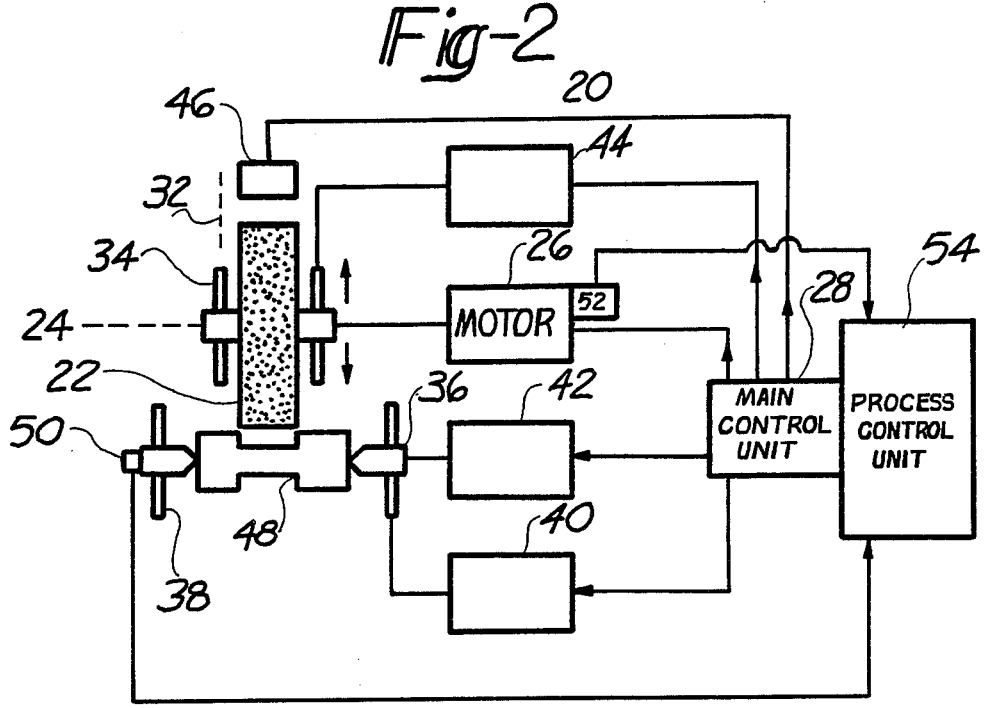
FIG. 2 diagrammatically illustrates portions of a grinding machine.

Since the present invention is directed to methods for a grinding machine, such machine, its computer or controller interface and workpiece have been illustrated schematically. With reference to FIG. 2 there is shown a grinder (grinding machine) 20 comprising a grinding wheel 22 mounted for rotation about axis 24. The grinding wheel 22 is rotated at a prespecified speed by a motor 26 in response to commands issued by a controller or main control unit 28. The wheel 22 may be capable of moving along axis 32 in a known manner. As an example the wheel 22 may be movable upon slides or guides 34 under control of a motor and/or gear unit 44 in response to signals generated by the control unit 28. The grinder 20, in general, may further include means for supporting (36), translating (38, 40) and rotating a workpiece (48). The grinder may further contain means for retruing or dressing (46) the outer surface of the wheel (22). Such means (46) may include a diamond implement movable parallel to axis (24) across the wheel surface in a known manner.

A general description of a constant sharpness method of grinding is set forth below. Two features of this method are that the feed rate (metal removal rate) $V_f$ is automatically determined and wheel sharpness is maintained at its after-dressing state. There is no set point value such as metal removal rate, horsepower, or force that has to be predetermined. The significance of the process is that it not only provides a means of maintaining constant wheel sharpness, but it also automatically determines feed rate. The feed rate is optimal for the wheel as it is dressed in the sense productivity is increased to the point at which further increases would result in excessive self-sharpening and possibly a deterioration in part quality. The constant sharpness method also forms a foundation for automating the grinding process.

Figure 3:
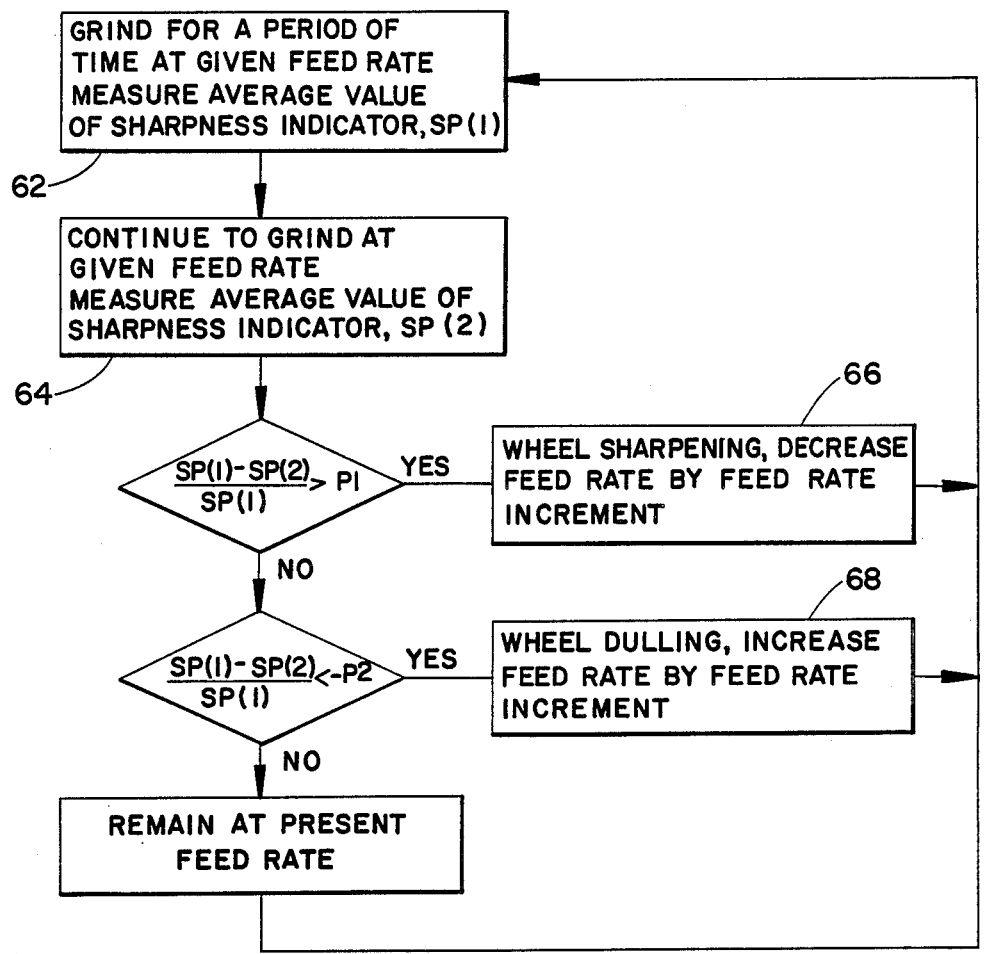
FIG. 3 is a flow chart for one form of the adaptive process.

It is generally known that at a given metal removal rate, steady state horsepower or normal force will decrease when the wheel is sharpening, and increase when the wheel is dulling. Therefore, either may be used as the indicator to sense changes in wheel sharpness. The adaptive control process preferably examines the change in a sharpness indicator (SP) for two successive grinds made at the same feed rate. Based on the change, the method adjusts feed rate for the following two grinds so as to maintain contant wheel sharpness. With this method, feed rate is preferably changed in discrete increments. These feed rate increments can be stored in a process control unit 54 (FIG. 2). This method is illustrated in FIG. 3 and further described below. Essentially two grinds are performed at an initial feed rate level and the sharpness indicator values of the grinds compared. Depending upon the nature of the change of the sharpness indicator between the two grinds, one of the following actions is taken and the procedure is repeated on subsequent parts:

| Indicator Change | Action |
| --- | --- |
| Increase | Wheel dulling, grind following two parts at next higher feed rate level. |
| No change | Grind following part at the same feed rate level and reexamine sharpness indicator change. |
| Decrease | Wheel sharpening, grind following two parts at next lower feed rate level. |

Since the method described above is predicated on the fact of utilizing two measurements of a sharpness indicator such indications need not correspond to the sharpness existing during a grind of different parts but a particular grinding operation may be divided into two subgrinds wherein the sharpness indication measurements and changes would be generated by examining the sharpness indications generated during the two subgrinds of a particular part.

As previously mentioned changes in sharpness can be detected by looking at changes in a variety of process parameters such as either horsepower or normal force at a given metal removal rate (block 62). The above method, as illustrated in FIG. 3, looks, however, at changes in these sharpness indicators at fixed, determinable, increments of the feed rate. It should be appreciated feed rate is not always proportional to metal removal rate. However, for steady state grinding conditions, feed rate can be used to approximate metal removal rate as shown by the following equation:

$$V_w = V_f - V_s - dX/dt$$

where
- $V_w$ = radial metal removal velocity
- $V_f$ = feed rate
- $V_s$ = radial wheel wear velocity
- $X$ = deflection
- $dX/dt$ = rate of change of deflection During the steady state of a grind, $dX/dt$ is zero and the $V_s$ term can be neglected for two reasons. First, since the sharpness indicator values are compared only at the same feed rate (with the wheel at approximately the same sharpness) then the Vs values will be essentially the same for the two successive grinds. Second, because the wheel is not operated in the breakdown region, $V_s$ is much smaller than $V_w$. Therefore, since feed rate is approximately equal to metal removal rate when the sharpness indicator value is measured, changes in the sharpness indicator truly represented changes in sharpness.

To handle random variations in the sharpness indicator measurement, the method does not consider the wheel to have either dulled or sharpened, unless the indicator change was greater than a certain threshold (P1, P2).

The equations used in the method shown in FIG. 3 to determine feed rate level are given below:

The feed rate would be decreased during the next two grinds because of wheel sharpening if $$\frac{SP(1) - SP(2)}{SP(1)} > P1 \tag{1}$$

and feed rate would be increased during the next two grinds because of wheel dulling if $$\frac{SP(1) - SP(2)}{SP(1)} < -P2 \tag{2}$$

where SP relates to a sharpness indicator such as horsepower or normal force.

With reference to block 62 of FIG. 3, the method requires grinding for a period of time at the then determined feed rate and to thereafter compute the average value of a a particular sharpness indicator (block 64). For the method shown in FIG. 3 metal removal rate may be measured directly and substituted for feed rate. The sharpness indicator noted in blocks 62 and 64 will typically be the average value of normal force or horsepower. Further, the then current feed rate will either be the initial feed rate or the incrementally adjusted feed rate (blocks 66, 68). It is apparent the feed rate may be established by a fixed table of incremental feed rates or established by incrementing or decrementing the then current feed rate by a fixed increment.

With the above equations and method depicted in FIG. 3 a small amount of sharpening (less than P1 between successive grinds is allowed to occur. Similarly, a small amount of dulling (less than P2 between successive grinds) is allowed to occur. A modified method of grinding which will allow only a slow sharpening action to occur is established by the following equations:

The feed rate would be decreased because of sharpening if:

$$\frac{SP(I) - SP(I + 1)}{SP(I)} \geq P1 \tag{3}$$

The feed rate would remain at the present feed rate level if:

$$P1 > \frac{SP(I) - SP(I + 1)}{SP(I)} \geq 0 \tag{4}$$

or if:

$$0 > \frac{SP(1) - SP(I + 1)}{SP(1)} > -P2$$

The feed rate would increase a level if:

$$-P2 \geq \frac{SP(1) - SP(I + 1)}{SP(1)}$$

where I and (I+1) are the I and I+1 grinds counted from the start of the present feed rate level.

Note that these equations allow a slow sharpening action to occur but prevent a slow dulling action by comparing the first and last grinds in a group of successive grinds all made at the same feed rate level.

A similar set of equations can be written for the case where a slow dulling action is allowed to occur but a slow sharpening action is prevented.

Figure 4:
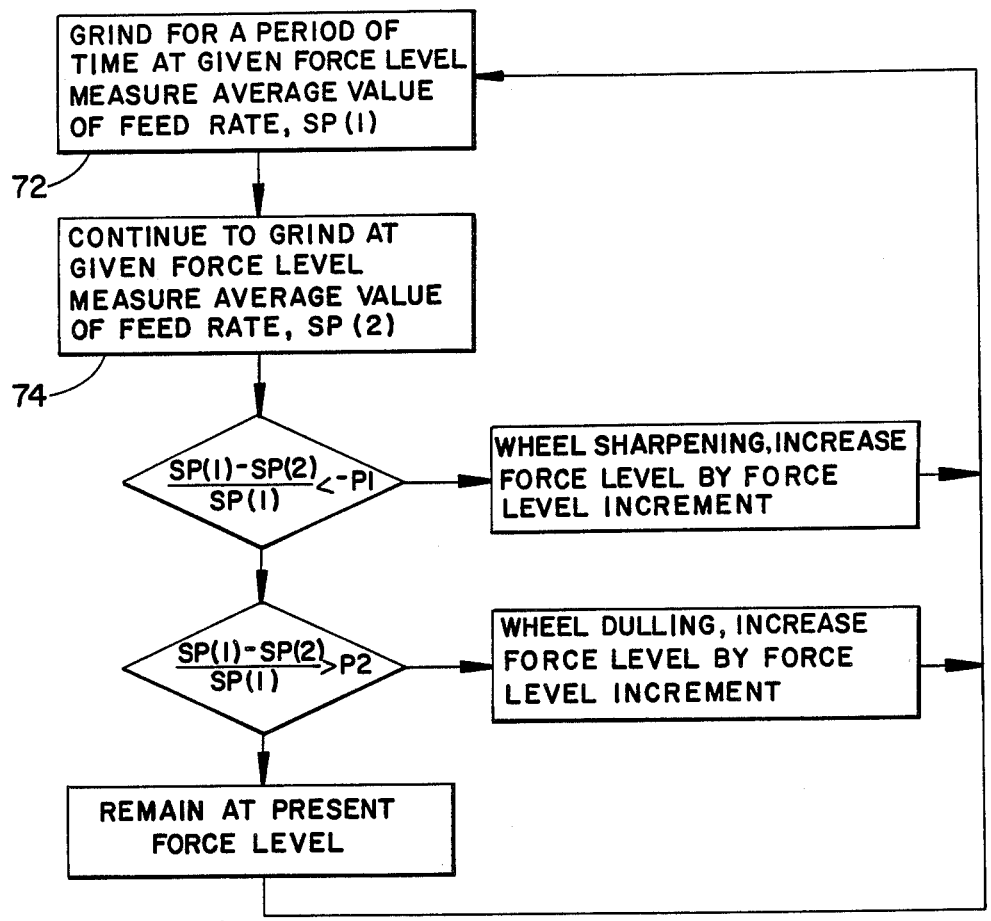
FIG. 4 is a flow chart for another form of the adaptive process.

Reference is briefly made to the flow chart illustrated in FIG. 4. The method or process defined therein is similar to the process illustrated in FIG. 3. FIG. 4 illustrates the control parameter may alternatively include the set of normal force or horsepower and wherein the sharpness indicator may be one of either metal removal rate or feed rate. Another second set of process parameters can be furnished for use within the method illustrated in FIG. 4. Such alternate set of parameters would utilize as the controlled variable, one of either feed rate, metal removal rate, normal force or horsepower while the sharpness indicator would be surface finish. Such surface finish may be measured manually by momentarily removing each part or pair of parts to measure the change in surface finish and thereafter modify the controlled parameter (feed rate, metal removal rate, normal force or horsepower accordingly). Surface finish may also be measured automatically by using optical means.

When the wheel is dressed or redressed with a dull diamond it has been found during the first two grinds after wheel dressing, the wheel experiences a rapid self-sharpening, even for a very low feed rate that would not normally cause self-sharpening. Because of this conditioning action, the first two grinds after dressing are handled differently than indicated by the various methods described herein. The first part to be ground after dressing is ground at the reference feed rate, which is typically set as a relatively low feed rate thought to be below the feed rate that would maintain constant sharpness. If the method is being performed for the first time, then the second, third and fourth parts to be ground are also ground at this reference level. The change in sharpness on the third and fourth parts is then used in the above equations to determine the feed rate for the next two grinds. If the method had been operative during a previous grinding cycle the system most probably had stabilized at a feed rate sufficient to maintain constant sharpness. Consequently, the initial conditional grinds after the grinding wheel is redressed are handled in the following manner. The initial grinding may be performed at the initial reference level; however, during a following predetermined number of grinds the feed rate is gradually increased to the last feed rate established during the previous grinding cycle. As an example: the second grind may be performed at one-quarter of the last feed rate of the prior cycle, the third grind performed at one-half the last feed rate, etc.

To monitor the process parameters a piezoelectric load washer (50) may be mounted in one of the work centers to monitor the normal and tangential force components as shown in FIG. 2. Further, a wattmeter (52) may be incorporated in a known manner at the grinding wheel motor to measure main spindle or horsepower.

The average values of the sharpness indicator (blocks 62, 64, 72, 74), can be measured using a real-time minicomputer or process control unit (54) sampling at a predetermined sampling rate during the steady state part of the grind. The process control unit (54) interfaces with control 28 to control the feed rate of the wheel 22 along the slide 34. A predetermined number of parts may be ground before wheel retruing or dressing. After wheel retruing, a new iteration of the constant sharpness process test is begun. The first two parts to be ground are handled as previously described.

The following provides a detailed description of the preferred embodiment of the adaptive control methodology. As previously described the control system and method attempts to maintain constant sharpness by determining whether or not the wheel is dulling or sharpening. In summary, the control system monitors changes in horsepower or normal force on two successive grinds performed at the same feed rate and under the same conditions. If the horsepower or normal force has increased, then the wheel is dulling and the feed rate is increased on the next two grinds. The two grinds may be performed on the same workpiece or divided between two successive parts. If the sharpness indicator such as horsepower or normal force has decreased, then the wheel is sharpening and the feed rate is decreased for the next two grinds. This comparison is repeated on successive pair of grinds to slowly adjust the grinding machine to a point at which the wheel is neither dulling nor sharpening. In addition to establishing a constant sharpness method of operation, the system further includes means for limiting feed rate if burn is detected.

Figure 5:
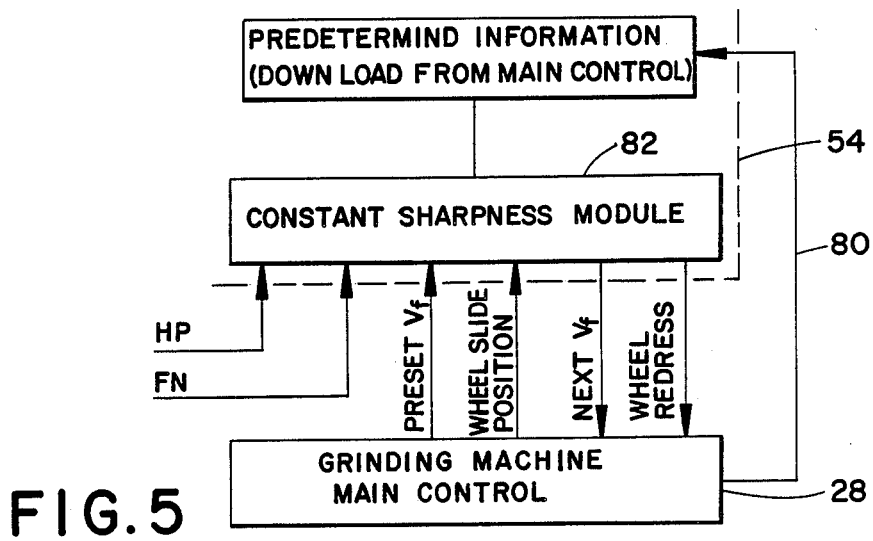
FIG. 5 schematically illustrates the relationship between a machine control unit and a process control unit.

The interrelationship between the grinding machine control unit 28 and the process control unit 54, previously shown in FIG. 2, is defined in greater detail in FIG. 5.

The process control unit 54 may be a subset of the grinding machine control unit and are separate therefrom. Process control parameters, such as feed rate $V_f$, sampling rate, burn limit are downloaded to the process control unit 54 via data bus 80.

The process control unit 54 contains therein various instructions sufficient to effect a constant sharpness module 82 defined by equations 1-4. The process control unit 54 utilizes, as shown in FIG. 5, input data such as normal force FN, horsepower HP, slide position, burn limit and number of parts to redress. The above input data may be input directly to the process control unit 54 or main control unit 28 and distributed appropriately.

An initial medium level feed rate must be specified. This value should be on the conservative side so the wheel does not start in the self-sharpening region as shown in FIG. 1. The constant sharpness module operates on a part-to-part basis slowly increasing the feed rate and thus the normal force until the force becomes high enough to cause the wheel to self sharpen. After this operating point is reached the feed rate and force, i.e., sharpness, will be maintained essentially constant.

In general, the horsepower or normal force that is used to measure changes in wheel sharpness is determined by sampling the appropriate signal for several seconds during the medium feed portion of the cycle. The samples are averaged to determine a value. Tests have shown that a sampling rate in the 30 to 300 Hz range is sufficient. Further the method must be told when to start and stop sampling. As an example the sampling must not start until spark-in is completed and a steady state condition has been achieved and the sampling must stop when the slow feed is started. In addition knowing the amount of material to be removed and making allowances for variations, the sampling can be started based on slide position.

Figure 6:
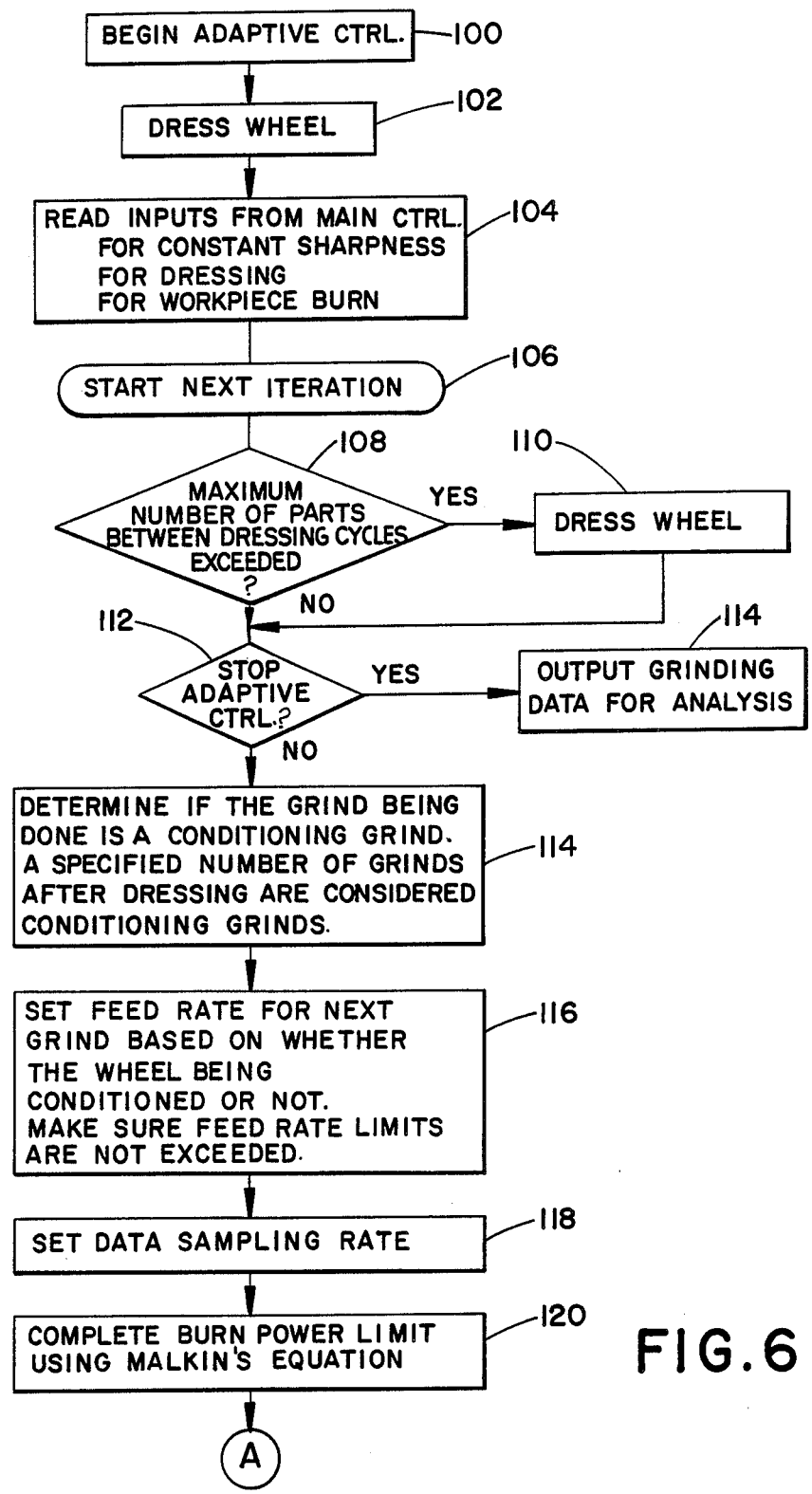
FIG. 6 illustrates still another form of the adaptive process.
Figure 6:
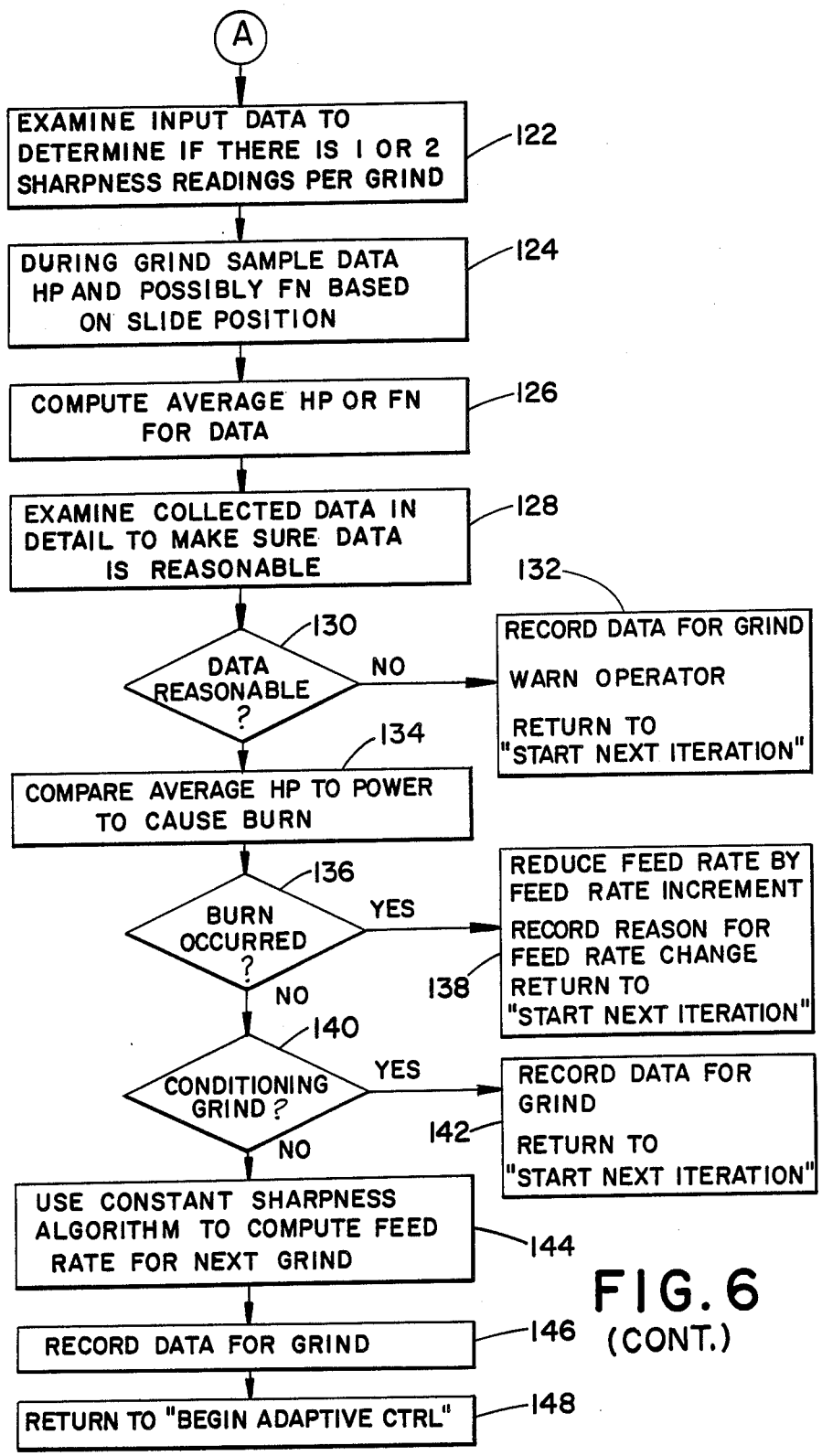

The attached flow charts, as shown in FIG. 6, describe the operation of the constant sharpness module 82.

The constant sharpness module begins in block 100.

Block 102 requires the wheel be freshly dressed when starting constant sharpness grinding. Therefore a command is sent to the main control 28 to have the wheel dressed during which time the wheel dressing module 84 is activated.

Block 104 reads input information from the main control. The input information is as follows:
For constant sharpness:
  Normal force or horsepower as sharpness indicator
  Sharpness change criterion
  Upper and lower limits of feed rate
  Reference feed rate, initial feed rate and feed rate increment
  Number of sharpness readings per grind, 1 or 2
  Number of conditioning grinds following wheel dressing
  Data sampling rate
  Slide positions to begin and stop data acquisition
For wheel dressing:
  Number of parts to be ground between dressing cycles
For burn elimination:
  Nominal work surface speed
  Nominal part width
  Nominal wheel diameter
  Burn criterion Having acquired the required data the adaptive control process begins in block 106.

Block 108 checks how many parts have been ground since the last dressing cycle to determine if it is larger than the maximum number of parts between wheel dressing cycles. If it is, then a command is sent to the main control (block 110) to have the wheel redressed and a part counter contained within block 108 reinitialized. This redressing is needed to restore desired geometry to the wheel face.

Block 112 determines if adaptive control grinding should stop. If a stop command is given then block 114 prints out information that can be used to evaluate the adaptive control grinding and information that can be used to restart the adaptive control at a later time.

In block 114 logic is executed to determine if the grind being done is a conditioning grind. As indicated above, generally the first two grinds following dressing are conditioning grinds and are handled differently by the constant sharpness method. In block 116 the feed rate for the next grind is set. If the wheel is being conditioned, and the first part following dressing is being ground, then the feed rate is set to the reference value. In other conditioning grinds the feed rate is gradually increased from the reference level to the fed rate level determined during the last controlled sharpness cycle. Block 116 also checks to see if the maximum or minimum feed rate limits have been reached. Note, it may be desirable to warn the operator or note in the run log that the part feed rate is being limited.

Block 118 sets the sampling rate. This would be done based on the available memory and the length of the grind. In tests that have been conducted sampling rate of 30 to 60 Hz have been used. However, sampling rates of 200 to 300 Hz would be preferred if memory is sufficient.

Block 120 computes the horsepower to cause burn (HPBURN) using Malkin's equation wherein:
$$HPBURN = 135V_w(V_f/N_w) + 6.21(D_e(V_f/N_w)^{\frac{1}{2}})W + HP_o$$

wherein:
$V_w$ = work surface speed
$D_e$ = equivalent diameter
$W$ = width of grind
$HP_o$ = no load power
$V_f$ = feed rate
$N_w$ = work rotational speed The logic of block 122 looks to see if there are one or two sharpness readings per grind. If there is one sharpness reading per grind then appropriate counters must be set so that appropriate information can be recalled when doing the change in sharpness calculations. One sharpness reading per grind may be used when the grinding cycle on a part is so short there is not sufficient time to obtain two sharpness readings. For the condition of one reading per grind the sharpness change is determined by the change in the sharpness indicator (i.e., average horsepower or normal force) between successive grinds at the same feed rate level.

In block 124 the data sampling begins based on slide position. Sampling would start at a slide position at which the spark-in is completed and the grind is in a steady state condition. Sampling would stop when the medium feed is finished.

Block 126 computes average horsepower or normal force from sampled data.

Block 128 computes various quantities that are examined in block 130 to determine if the data is reasonable.

If the data is not reasonable, then block 132 is entered. The data for the grind is recorded, a warning is sent to the operator, the control is returned to start the next iteration In blocks 134 and 136 the average horsepower measured during the grinds is compared to the power to cause burn calculated in block 120. When this comparison is made, a user specified burn criterion is applied to Malkin's equation. The burn criterion allows the user to set a burn limit a specified amount above or below the varlue given by his equation.

If burn occurs block 138 is entered. The feed rate is reduced, the reason for the feed rate change recorded and the control returns to start the next iteration.

Block 140 conditions are examined to determine if the grind was a conditioning grind.

Block 142 is entered if this grind was a conditioning grind. The data is recorded and the control returns to start the next iteration.

Block 144 contains the logic of the constant sharpness algorithm as described previously. The change in the sharpness indicator is calculated and, depending on how it changes, the feed rate is incremented.

In block 146 data for the grind such as the average value of the sharpness indicator and feed rate are recorded and in block 148 the control returns to start the next iteration.

Having thus described the invention what is claimed is:

1. A method of grinding the surface of workpieces by a grinding machine having a grinding wheel which exhibits a characteristic of attrition in which the grinding wheel dulls with continued grinding or a characteristic of self-sharpening in which the grinding wheel sharpens with continued operation, said grinding wheel sharpness being detectable by measuring the value of process parameters correlatable with grinding wheel sharpness, said grinding wheel having neither characteristic at a predetermined level of controlled operating parameters, comprising the steps of:
   (a) conditioning the surface of the grinding wheel to establish a desired level of wheel sharpness,
   (b) grinding for a first interval at a determinable level of said controlled operating parameters,
   (c) measuring and storing the value of a first process parameter correlatable with grinding wheel sharpness generated during the first interval,
   (d) grinding for a second interval at the determinable level of the said controlled operating parameters,
   (e) measuring and storing the value of the first process parameter generated during the second interval,
   (f) comparing the stored values of the first process parameter generated during the respective first and second intervals to generate control signals corresponding respectively to either an increase in grinding wheel dullness or sharpness,
   (g) adjusting the level of said controlled operating parameters in response to generation of either of said control signals so as to eliminate either of said grinding wheel characteristics and to maintain the sharpness of the grinding wheel at the desired level.

2. The method as defined in claim 1 wherein said first process parameter is one of either the normal force exerted on a workpiece or the horsepower required to rotate the grinding wheel.

3. The method as defined in claim 2 wherein said controlled operating parameter is one of either feed rate or work removal rate.

4. The method as defined in claim 1 wherein the step of conditioning includes the step of dressing the surface of the grinding wheel.

5. The method as defined in claim 4 wherein the step of conditioning further includes grinding a predetermined number of workpieces at said predetermined level of said controlled operating parameter.

6. The method as defined in claim 1 wherein the step of grinding for a determinable first interval and the step of grinding for a determinable second interval are performed on different workpieces.

7. The method as defined in claim 1 further including the steps of:
   grinding at least one other workpiece for a said interval at the level of the first controlled operating parameter as determined during the prior step of adjusting; and
   repeating steps (1.c) through (1.g).

8. The method as defined in claim 6 further including the steps of:

grinding at least one other workpiece for a said interval at the level of the first controlled operating parameter as determined during the prior step of adjusting; and repeating steps (1.c) through (1.g).

9. The method as defined in claim 1 wherein the steps of measuring includes computing the average value of the first process parameter prior to storing same.

10. The method as defined in claim 1 further including calculating a limit value of grinding wheel horsepower sufficient to cause burning of the workpiece;

comparing the average grinding wheel horsepower to the limit value, and reducing the value of said controlled operating parameter to effect a reduction in average grinding wheel horsepower.

11. The method as defined in claim 10 further including the step of reconditioning the grinding wheel to reestablish the desired level of wheel geometry after a predetermined number of grinds.

12. The method as defined in claim 11 wherein the step of reconditioning includes redressing the grinding wheel and thereafter performing a predetermined number of grinds.

13. The method as defined in claim 12 wherein the value of the said controlled operating parameter used during the predetermined number of grinds is gradually increased from a reference level to the level established prior to reconditioning.

14. The method as defined in claim 3 wherein the step of adjusting includes:

decreasing the feed rate by a predetermined amount if:

$$\frac{SP(1) - SP(2)}{SP(1)} > P1, \text{ and}$$

increasing the feed rate by a predetermined amount if:

$$\frac{SP(1) - SP(2)}{SP(1)} < -P2;$$

wherein SP(1) corresponds to a first stored value of the first process parameter, SP(2) corresponds to a second stored value of the first process parameter, and P1, P2 correspond to permissible percentage changes of grinding wheel sharpness.

15. The method as defined in claim 3 wherein the step of adjusting includes:

decreasing the feed rate if $$\frac{SP(I) - SP(I + 1)}{SP(I)} \geq P1$$

increasing the feed rate if:

$$\frac{SP(1) - SP(I + 1)}{SP(1)} \leq -P2$$

maintaining the feed rate at its then current value if:

$$P1 > \frac{SP(I) - SP(I + 1)}{SP(I)} \geq 0$$

or $$0 > \frac{SP(1) - SP(I + 1)}{SP(1)} > -P2$$

wherein SP(1) corresponds to the first stored value of the first process parameter for the first of a group of successive grinds done at a level of the controlled parameter, SP(I), SP(I+1) correspond to the stored value of the first process parameter for any two successive grinds in a series of successive grinds all done at a level of said controlled operating parameter and P1, P2 correspond to permissible percentage changes of grinding wheel sharpness.

16. The method as defined in claim 15 wherein said controlled operating parameter is one of either feed rate, metal removal rate, normal force or horsepower and the first process parameter is surface finish.

17. The method as defined in claim 16 wherein the step of adjusting includes:

decreasing the feed rate by a predetermined amount if:

$$\frac{SP(1) - SP(2)}{SP(1)} < -P1, \text{ and}$$

increasing the feed rate by a predetermined amount if:

$$\frac{SP(1) - SP(2)}{SP(1)} > P2$$

wherein SP(1) corresponds to a first stored value of the first process parameter, SP(2) corresponds to a second stored value of the first process parameter, and P1, P2 correspond to permissible percentage changes of grinding wheel sharpness.

* * * * *